(12) United States Patent
Carty et al.

(10) Patent No.: US 11,858,863 B2
(45) Date of Patent: Jan. 2, 2024

(54) METHOD FOR FABRICATING PERFECTLY WETTING SURFACES

(71) Applicants: William Carty, Alfred Station, NY (US); Hyojin Lee, Alfred Station, NY (US)

(72) Inventors: William Carty, Alfred Station, NY (US); Hyojin Lee, Alfred Station, NY (US)

(*) Notice: Subject to any disclaimer, the term of this patent is extended or adjusted under 35 U.S.C. 154(b) by 182 days.

(21) Appl. No.: 17/395,973

(22) Filed: Aug. 6, 2021

(65) Prior Publication Data

US 2022/0041514 A1 Feb. 10, 2022

Related U.S. Application Data

(60) Provisional application No. 63/061,907, filed on Aug. 6, 2020.

(51) Int. Cl.
*C04B 37/02* (2006.01)
*C04B 41/51* (2006.01)
*C04B 41/88* (2006.01)

(52) U.S. Cl.
CPC ........ *C04B 37/023* (2013.01); *C04B 41/5155* (2013.01); *C04B 41/88* (2013.01); *C04B 2237/121* (2013.01); *C04B 2237/365* (2013.01); *C04B 2237/402* (2013.01)

(58) Field of Classification Search
CPC ........................................ C04B 41/88
See application file for complete search history.

(56) References Cited

U.S. PATENT DOCUMENTS

| | | | | |
|---|---|---|---|---|
| 4,500,643 | A * | 2/1985 | Gesing | C04B 35/58071 501/96.3 |
| 4,600,481 | A * | 7/1986 | Sane | C25C 3/16 428/614 |
| 6,110,577 | A * | 8/2000 | Ishikawa | C22C 1/1036 428/313.9 |
| 2021/0269697 | A1* | 9/2021 | Goto | C09K 5/14 |

* cited by examiner

*Primary Examiner* — Robert A Vetere
(74) *Attorney, Agent, or Firm* — C. John Brannon; Brannon Sowers & Cracraft PC

(57) ABSTRACT

A method of preparing a substrate having a wetting surface, including confirming the presence of an open, interconnected pore network in a ceramic substrate to be wetted with a first metal, filling the open, interconnected pore network with a second metal,
exuding the second metal to coat the surface of the substrate, and wetting the substrate with the first metal. The ceramic substrate is not decomposed by the first metal and the ceramic substrate is not decomposed by the second metal.

13 Claims, 1 Drawing Sheet

METHOD FOR FABRICATING PERFECTLY WETTING SURFACES

CROSS-REFERENCE TO RELATED APPLICATIONS

This patent application claims priority to U.S. provisional patent application Ser. No. 63/061,907, filed on Aug. 6, 2020.

BACKGROUND

The wetting of a surface by a given fluid tends to be dictated by several factors that range from differences in polarity between the surface and the fluid, surface roughness, contamination, and other practical considerations. These factors can interact in complex and unpredictable ways such that small changes can change the overall wetting behavior of the fluid or can cause wetting variations even on an otherwise wetting surface. Non-wetting leads to flow irregularities, unpredictability, and instabilities in fluid flow.

One perfectly wetting surface is the fluid itself. A typical fluid is generally immune to impurities, contamination, irregularities, and chemical differences at the surface of the fluid. The problem with a fluid, however, is the inability of the fluid to hold a specific shape—it is free to deform and change in accordance with the very definition of a fluid. Thus, there a need remains for a better wetting surface and method for the preparation thereof. The present nove technology addresses this need.

DETAILED DESCRIPTION

Figure 1A:
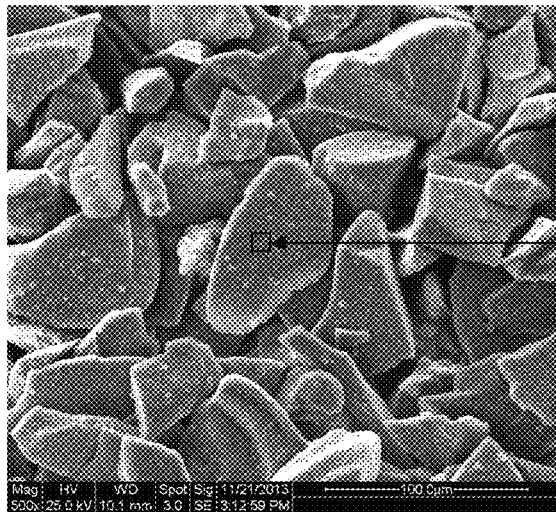
FIG. 1A is an SEM photomicrograph of metal coated SiC according to one embodiment of the present novel technology.
Figure 1B:
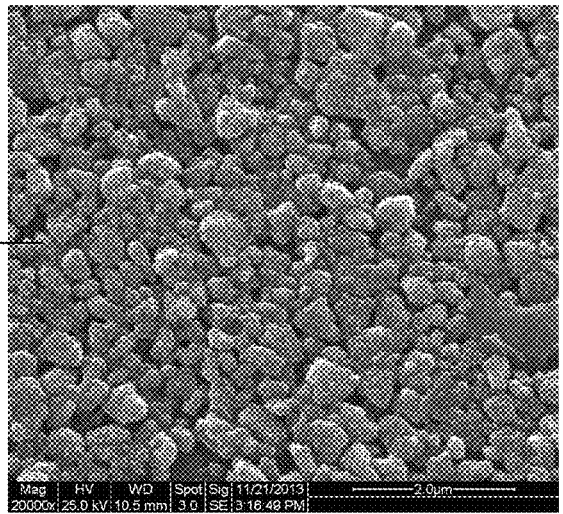
FIG. 1B is an SEM photomicrograph of coarse SiC powders.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

As shown in FIGS. 1A-2B, the present novel technology relates to a perfectly wetting surface with a substrate having a predetermined fixed geometric shape, as well as the method for producing the same. The wetting surface can be obtained by creating a rigid, inorganic but porous substrate that can be filled, for example by infiltration into the porous geometric substrate, with the fluid material intended to wet. If this fluid is a molten and or near/molten metal, upon melting the metal volume expands (with only one commonly known exception, silicon metal), exudes from the pores onto the substrate surface, and provides a thin layer of liquid that matches the molten metal intended to wet. On cooling the molten metal volume decreases as it eventually solidifies. The density increase on solidification substantially reduces the volume, causing the metal to retreat into the pore structure where it resides until the system is heated again. The next time the system is heated the metal melts to become a fluid that expands and exudes out of the pores to the surface again providing a perfectly wetting surface. The process can be repeatable over multiple cycles.

The metal may be an elemental metal, such as aluminum, silver, copper, or the like, or may be an alloy, such as solder (lead-tin, tin-silver-copper or the like), bronze, or the like. It may be advantageous to use an alloy to infiltrate the pores if the wetting metal is likewise an alloy of the same metals or one of the metals in the alloy.

One embodiment of this invention includes the fabrication of a porous substrate having a predetermined geometric shape and comprising a monolithic ceramic in which the pores can be filled with a given liquid such as a molten metal. For purposes of this description a given ceramic is to be considered as a non-metallic material including, but not limited to, oxide, carbide, nitride, and/or boride bodies that exhibit ionic or covalent bonding. The porous substrate can be a ceramic with a continuous pore structure and can be prepared by powder processing followed by sintering to a point where there is a continuous pore structure and where the sintered substrate exhibits sufficient strength for a given application. It is anticipated that the sintering temperature will typically be greater than the melting point of the metal intended to wet the surface. Applicants appreciate that if the sintering temperature were to be less than the melting point of the metal, the pore structure would likely continue to decrease with time leading to dimensional instability and eventual failure.

Applicants appreciate that a given infiltrated fluid can be similar or identical to the liquid desired for wetting upon the outer surface of the substrate. The fluid is provided by heating the solid above the infiltrated metal's melting point. Some candidate metals are listed in Table I. These examples are listed for descriptive purposes and this invention is in no way intended to be limited in this regard. Except for silicon, all the metals possess a solids density that is greater than the liquid density. Therefore, on melting a given non-silicon metal, the volume of the resulting fluid is greater than that of the initial solid metal. Typically, at least a five-percent increase in volume is required to provide a surface coating of liquid metal in the application. There does not appear to be an upper limit for the application regarding the volume increase on melting.

TABLE I

List of potential elemental metals that could be used to fill the pore structure. In this list there is only one metal that will not work for this application (silicon, left in for contrast purposes) because the density of the molten metal is greater than the density of the solid so on melting the volume decreases. Other metallic elements, alloys, or compounds could likewise potentially work to create perfectly wetting surfaces.

| Element | Name | Atomic # | $T_M$ (° C.) | Solid density (g/cm$^3$) | Molten (liquid) density (g/cm$^3$) | Density Decrease on Melting* | Volume difference (%) |
|---|---|---|---|---|---|---|---|
| Mg | Magnesium | 12 | 650 | 1.738 | 1.584 | 0.154 | 9.7% |
| Al | Aluminum | 13 | 660 | 2.7 | 2.375 | 0.325 | 13.7% |
| Si | Silicon | 14 | 1414 | 2.33 | 2.58 | −0.25 | −9.7% |
| S | Sulfur | 16 | 115 | 1.96 | 1.819 | 0.141 | 7.8% |
| Ti | Titanium | 22 | 1668 | 4.506 | 4.11 | 0.396 | 9.6% |
| Mn | Manganese | 25 | 1246 | 7.47 | 5.95 | 1.52 | 25.5% |
| Fe | Iron | 26 | 1538 | 7.87 | 6.98 | 0.89 | 12.8% |
| Co | Cobalt | 27 | 1495 | 8.9 | 7.75 | 1.15 | 14.8% |
| Ni | Nickel | 28 | 1455 | 8.908 | 7.81 | 1.098 | 14.1% |
| Cu | Copper | 29 | 1085 | 8.96 | 7.898 | 1.062 | 13.4% |
| Zn | Zinc | 30 | 420 | 7.13 | 6.57 | 0.56 | 8.5% |
| Mo | Molybdenum | 42 | 2623 | 10.28 | 9.33 | 0.95 | 10.2% |
| Ag | Silver | 47 | 962 | 10.49 | 9.346 | 1.144 | 12.2% |
| Sn | Tin | 50 | 232 | 7.31 | 6.99 | 0.32 | 4.6% |
| Au | Gold | 79 | 1064 | 19.32 | 17.31 | 2.01 | 11.6% |
| Pb | Lead | 82 | 327 | 11.36 | 10.68 | 0.68 | 6.4% |

*A negative value indicates that the solid density is less than the molten density and therefore the metal will expand during solidification.

A sintered ceramic may be prepared and provided as an initial step. While not wishing to be limited in this respect, it has been demonstrated that that a small and uniform pore size tends to be generally desirable, for example with a mean pore diameter not larger than 20 microns, and more typically the pore diameter is in the range of 5-10 microns. Typically, a uniform pore structure will tend to provide for a more uniform liquid metal coating of the substrate. In some embodiments the porous substrate can be machined to the proper shape either before or after sintering, depending on the application.

Once the sintered substrate has been prepared the sintered substrate may be placed into a vacuum furnace in contact with the metal intended to be used to fill the pore. The furnace chamber, and the porous body, are evacuated to remove air from the pore structure. Once evacuated the furnace can be heated to sufficient temperature to melt the metal and the metal is then introduced by infusion to the compact. There are generally two cases: (1) the metal wets the substrate; and (2) the metal does not wet the substrate.

(1) The metal wets the substrate: The sintered substrate is placed in a crucible containing solid metal particles or chunks. The sample is evacuated by way of vacuum, the metal melts and wets, and because it is wetting, it infiltrates the pore structure by capillary action. Once the infiltration process is complete the furnace is cooled, and the metal allowed to solidify within the substrate. It is possible that a post-infiltration machining step (or similar step such as grinding or bead blasting) can be advantageous for example to remove excess metal from the surface of the infiltrated substrate composite.

(2) The metal does not wet the substrate: The sintered compact is placed in a crucible and evacuated. A greater amount of metal is necessary in this case, as the substrate must be submerged in the liquid metal pool after melting. In most cases the molten metal fluid will have a higher density that the porous substrate. This can cause the substrate to float in the molten metal pool, such that the substrate may be held below the surface of the molten metal pool to effect complete and prolonged submersion of the substrate in the liquid metal. Once the metal is melted and the surface of the substrate is covered with molten metal, the furnace is pressurized to force the metal into the substrate pore structure. The amount of pressure required to force liquid metal into the substrate pore structure depends on the degree of non-wetting of the metal and the substrate pore size. Once the pore structure is filled, the furnace can be cooled to solidify the metal. The applied pressure in the furnace can be decreased after the metal has solidified. As with Case 1 above, a post-infiltration machining step (or similar step such as grinding or bead blasting) can be advantageous for example to remove excess metal from the infiltrated substrate composite.

The metal-infiltrated porous substrate is now ready for use for example in applications where it is desired to coat, by way of wetting, an identical and/or similar fluid onto the substrate surface. When heated above the melting point of the metal, the molten metal forms an identical and/or similar fluid that coats the exterior surface of the substrate. Since the coating fluid matches the chemistry of the infiltrated fluid, a perfectly wetting surface is created and there is the potential for the coating fluid to some extent mix with the liquid that fills the pores. Even if the metal is non-wetting, such infiltrated metal tends not to leave the pore structure on re-melting. When the application is completed, the substrate can be cooled, and the metal can be expected to retract back into the pore structure during solidification as described above.

The substrate can be prepared from various ceramic materials including but not limited to alumina, mullite, spinel, magnesia, refractory cements, zirconia, glass, silicon carbide, silicon nitride, combinations thereof, and the like. The choice of the substrate tends to be influenced by the melting point of the metal (as stated previously the sintering temperature of the substrate should generally be greater than the melting point of the metal) and by the relative stability of the oxide or carbide with respect to the molten metal. If, for example, the metal is more energetically favorable to form an oxide than the substrate material, the molten metal will scavenge oxygen from the oxide substrate and the substrate will be destroyed in use. The metal oxide stability can be predicted by using an Ellingham Diagram. An example of a potential problem would be the use of an alumina ($Al_2O_3$) as a substrate for magnesium metal (Mg). MgO is thermodynamically favored to form and the molten Mg will scavenge oxygen from the alumina substrate to create MgO. Similarly, a silicate-based substrate, such as a glass will generally be incompatible with aluminum metal as the Al tends to strip oxygen from the silicate to form alumina. The stability of these three oxides, from highest to lowest, is $MgO > Al_2O_3 > SiO_2$. A similar argument can be made for selecting carbides, but in this case the molten metal would prefer to form the carbide by stripping carbon from the carbide. This is less likely to be a concern but may become so if some of the high melting point refractory metals are used to create a wetting surface. For example, a SiC substrate could be used with molten aluminum because aluminum carbide ($Al_4C_3$) is less stable than SiC.

As a demonstration, a uniform pore structure SiC monolith was created as described below.

Preparation of Sintered Porous Silicon Carbide Porous Body

In one embodiment fine alumina ($D_{50}=0.3$ μm) and colloidal silica ($D_{50}=50$ nm) powders were added to the silicon carbide as sintering agents. The addition was conducted via a heterocoagulation process to adhere to the surface of SiC particles controlled amounts of alumina and silica. Two abrasive grade SiC powders were evaluated: 240 grit (coarse) and 1200 grit (fine). An example of the coated SiC surface is presented in FIG. 1. The heterocoagulation process was conducted in an aqueous medium.

A series of blends of coarse and fine SiC powders were prepared to control the pore size and pore volume. It is well known that particle packing can be altered by blending particle sizes and that the pore volume decreases with better packing efficiency. In addition, the finer particle size controls the pore size.

After coating, the coated SiC powders were re-suspended and slip cast into pellets using Lexan dies on gypsum molds. The slip cast pellets were dried then heat treated to various temperatures to determine a reasonable heat treatment cycle necessary to provide sufficient strength. The pellets exhibited limited shrinkage. The experimental matrix consisted of 9 batches with three powder blends heat treated at three temperatures with a hold time of 0.3 hours in air (Table II).

TABLE I

Experimental matrix including 9 samples

| Temperature (° C.) | 1200 Grit SiC Addition (%) | | |
|---|---|---|---|
| | 50 | 75 | 100 |
| 1550 | 1 | 2 | 3 |
| 1600 | 4 | 5 | 6 |
| 1650 | 7 | 8 | 9 |

All the sintered substrates possessed continuous open pore channels. The most uniform continuous pore channels were obtained from the fine SiC powders (1200 grit) alone, without coarse powder additions. All three heat treatment temperatures produced specimens with excellent mechanical integrity and continuous pore structures. At the higher sintering temperatures, however, (1600 or 1650° C.) the pore structure became well defined, with the pore channels developing a more cylindrical cross section and a narrower pore size distribution.

Figure 2A:
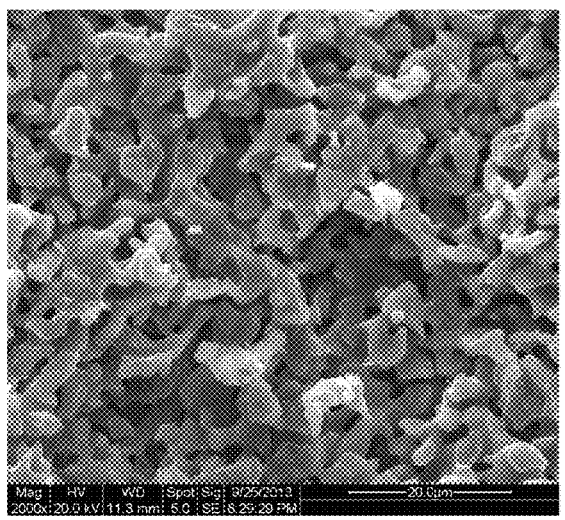
FIG. 2A is an SEM photomicrograph of a sintered SiC body prepared from fine SiC powders heat treated at 1600° C., showing a tortuous, but uniform, pore structure with an average pore size of approximately 5 microns.
Figure 2B:
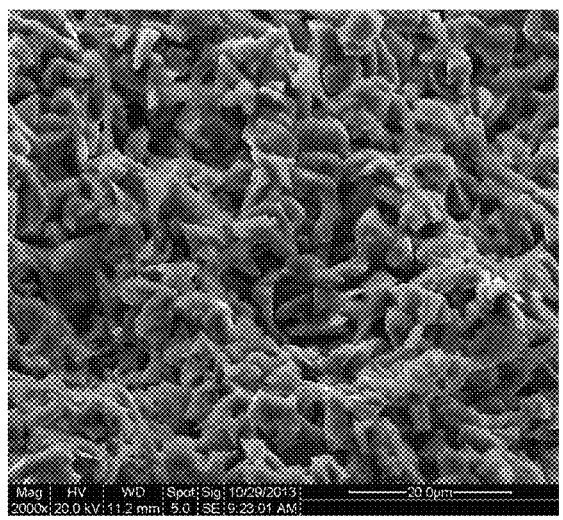
FIG. 2B is an SEM photomicrograph of a sintered SiC body prepared from fine SiC powders heat treated at 1550° C.

Examples of fracture surfaces showing this difference are presented in FIG. 2. From a microstructure perspective, it appears that the microstructure on the left (sintered at 1650° C.) has a more uniform pore structure and that the pores remain continuous. The microstructure on the right is less well defined but is still continuous.

Example: A ceramic monolith was formed and sintered to create a continuous pore structure with uniformly spaced pores with a diameter less than 20 microns, and typically between 5-10 microns. This pore structure was infiltrated with molten metal and then cooled to solidify the metal. On re-heating to the melting point, the volume of the metal increases and the metal exudes from the pore structure to form a liquid metal coating on the surface of the substrate. Since the molten metal exuding from the pores is identical in composition to the metal intended to wet, the surface becomes perfectly wetting to the liquid metal. On cooling the metal retracts into the pore structure, solidifies, and is stored in the pore structure. Upon re-heating, the process is repeated, and the molten metal exudes from the pore structure to recreate the wetting surface. In general, the substrate should be compatible with the molten metal, i.e., metals that are thermodynamically favored to form oxides should not be used with an oxide that is less stable. In other words, the substrate is not decomposed by the first and/or second metals. Carbides likely provide a ready material for the substrate. A specific example is a SiC monolith with a uniform continuous pore structure that can be filled with Al metal. When heated this system forms a perfectly wetting surface for molten aluminum metal.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A method of preparing a substrate having a wetting surface, comprising:
    a) confirming the presence of an open, interconnected pore network in a ceramic substrate to be wetted with a first metal;
    b) filling the open, interconnected pore network with a second metal;
    c) heating the substrate to exude second metal from the interconnected pore network to coat the surface of the substrate; and
    d) wetting the substrate with the first metal;
    wherein upon cooling the substrate after step c), the second metal withdraws back into the interconnected pore network;
    wherein after step b), the second metal is completely disposed in the interconnected pore network;
    wherein the ceramic substrate is not decomposed by the first metal; and wherein the ceramic substrate is not decomposed by the second metal.

2. The method of claim 1 wherein the first and second metals are identical.

3. The method of claim 1 wherein the second metal is an alloy including the first metal as a constituent.

4. The method of claim 1 wherein the ceramic substrate is selected from the group consisting of metal oxides, metal carbides, metal nitrides and metal borides.

5. The method of claim 1 wherein the first metal is elemental and wherein the second metal is an alloy including the first metal as a constituent.

6. The method of claim 1 wherein the first metal has a first melting point; wherein the second metal has a second melting point; and wherein the ceramic substrate has a sintering temperature greater than the respective melting points of the first and second metals.

7. The method of claim 1 wherein the open, interconnected pore network has a mean pore diameter of less than twenty microns.

8. The method of claim 7 wherein the mean pore diameter is between five and ten microns.

9. The method of claim 1 wherein b) occurs under increased pressure.

10. The method of claim 1 wherein before b), the substrate is exposed to a partial vacuum to evacuate air from the open, interconnected pore network.

11. A method of preparing a wettable substrate, comprising:

q) verifying the existence of an open-cell pore network in a ceramic substrate desired to me wetted with a first metal;

r) evacuating air from the open-cell pore network;

s) infiltrating the open-cell pore network with a second metal to yield an infiltrated substrate, wherein the second metal is disposed entirely within the open-cell pore network;

t) heating the infiltrated substrate to exude second metal from the open-cell pore network to produce a second metal coating over the infiltrated substrate to yield a coated substrate;

u) wetting the coated substrate with the first metal to yield a wetted substrate;

wherein the first metal has a first melting point; and v) cooling the substrate to draw the exuded second metal back into the open-cell pore network;

wherein the second metal has a second melting point; and wherein the ceramic substrate has a sintering temperature greater than the respective melting points of the first and second metals.

12. The method of claim 11 wherein during step s) the ceramic substrate is immersed in molten second metal under sufficient pressure to force second metal into the open-cell pore network.

13. The method of claim 11 wherein the first metal is the same as the second metal.

* * * * *